UNITED STATES PATENT OFFICE.

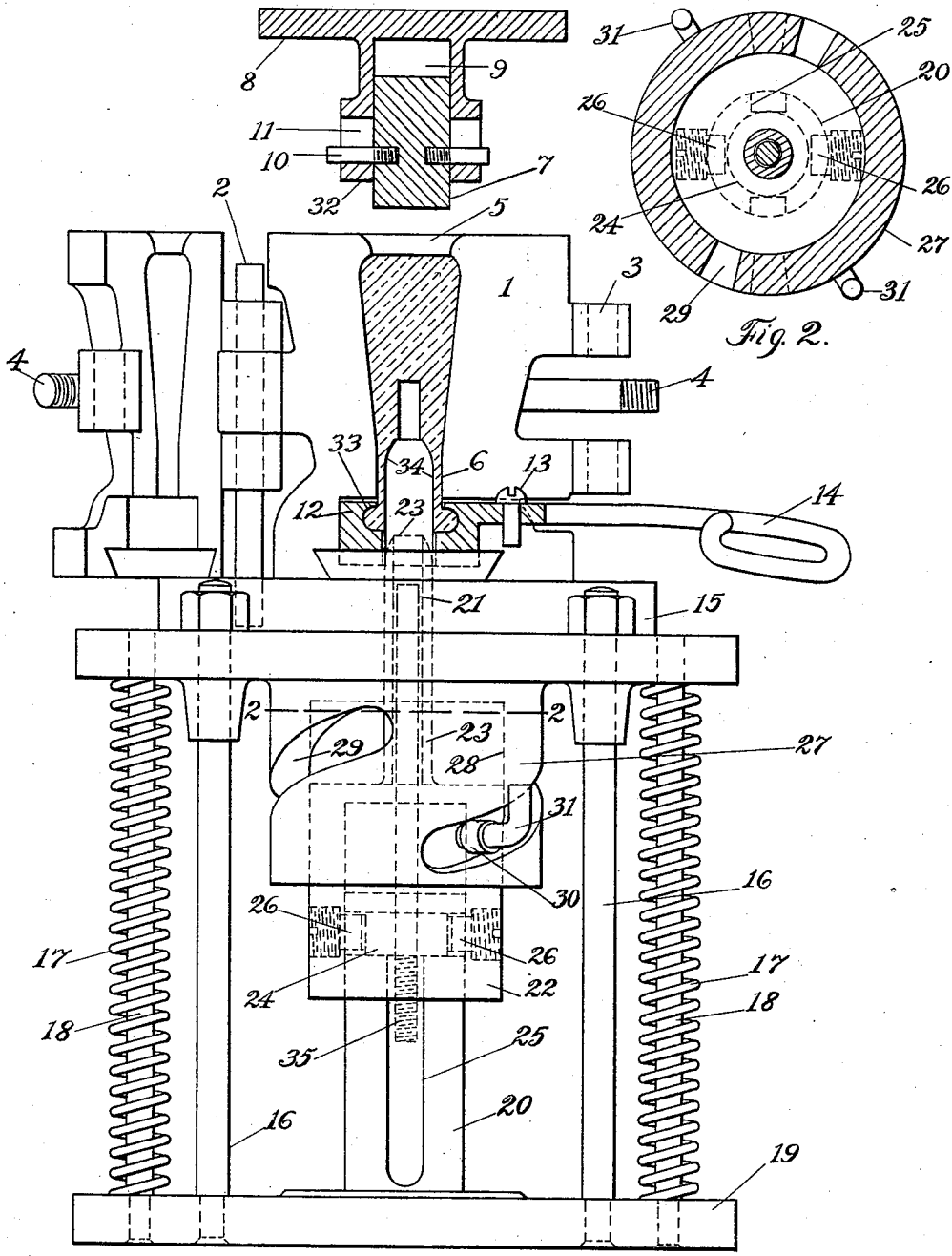

WALTER E. SAVAGE, OF BELLAIRE, OHIO.

MACHINE FOR MAKING BOTTLE-BLANKS.

1,011,647. Specification of Letters Patent. Patented Dec. 12, 1911.

Application filed April 1, 1911. Serial No. 618,462.

*To all whom it may concern:*

Be it known that I, WALTER E. SAVAGE, a citizen of the United States of America, residing at the city of Bellaire, county of Belmont, State of Ohio, have invented certain new and useful Improvements in Machines for Making Bottle-Blanks, of which the following is a specification.

In my Patent No. 944,053 I describe a machine for forming bottle blanks, which consists of a press-mold, a neck-mold and a former. The press-mold is open at both ends corresponding to the neck and bottom of the bottle, is inverted and is mounted on a yielding support. The former, which is a tapering spike or punch, is mounted beneath the mold in alinement with the neck opening, and any suitable plunger is mounted to reciprocate above the mold to engage it and move it downward against the resistance of its support. The aperture in the top of the mold at the end of the blank, which corresponds to the bottom of the bottle, is in the path of the plunger, and the latter is shaped and of suitable size to coöperate with the opening to close it on the downward stroke. The gather is introduced into the mold through the opening adjacent the part of the blank which is to form the bottom of the bottle, while the plunger is withdrawn, after which the plunger is advanced, engaging the opening at the bottom of the blank, and at the same time, depressing the mold. As the resilient means, supporting the mold, yield, the latter moves downward, the former enters the neck opening, and the blank is completed in the usual form, the neck is substantially finished, and the remainder of the blank, which is still hot and in plastic condition, is pierced with an aperture extending inward from the neck to a point near the center of the plastic mass. This is for admitting compressed air when the bottle is blown.

My present invention relates to an improvement in the apparatus described in my former patent, but its application is not limited to that particular device. The blank-forming machine, which is the subject of my patent, is effective in its operation, but it has certain defects, and to remedy these is the object of my invention.

In forming a blank in the operation of my old machine, I find that the neck mold is filled when the plunger first compresses the blank. Later, when the former is introduced, it has the effect of emptying the neck mold and moving the entire plastic mass toward the top of the press mold. Later, as the former advances and the blank is subject to increased compression, the neck mold is again filled. To ascertain with exactness when the neck-mold has been filled is difficult though not impossible, and if the operation of compressing is continued before the neck-mold has been filled, the bottle will be imperfect. In the attempt to eliminate all uncertainty of producing imperfect bottles, it often happens that too great pressure is applied to the blank and the glass in the vicinity of the neck is shattered. Also, the amount of pressure required to fill the neck-mold in this manner is so great, that the plunger is sometimes caused to enter a short distance into the bottom of the blank or a small portion of the glass escapes between the plunger and the edges of the aperture. As a result of this, the completed bottle is sometimes found to be rough and irregular on the bottom.

I have found that by rotating the former, the tendency to empty the neck-mold in the early stages of the pressing operation is eliminated in producing bottles automatically after the manner partially described in this application and my previous patent. Therefore, I have combined with my former machine a rotary sleeve or cutter inclosing a rod, which is the equivalent of the former in the old machine. In order that the air used in blowing the blank may be applied at the proper point, it is necessary that the pressed blank be punched from the neck well up to or beyond the center of the plastic mass of glass forming the body of the blank. However, this aperture need not be as large as the neck opening, and there seems to be much less danger of removing the glass from the neck-mold by introducing the former when the latter is made in two parts, a small punch and a surrounding sleeve, the punch being advanced well into the blank beyond the sleeve to form the aperture for introducing compressed air in blowing the blank, and the sleeve being of suitable diameter to form the neck opening of the bottle.

In the present machine I provide a punch and a rotary sleeve inclosing the punch, means for introducing the sleeve into the neck-mold and rotating the same as it enters, and means for passing the punch through the sleeve and beyond it well into the body of the blank.

In the accompanying drawing I have shown sufficient of a machine embodying my invention in order that its operation may be understood.

Figure 1 is an elevation. Fig. 2 is a sectional plan taken on the line 2, 2 of Fig. 1, and looking downward.

The machine consists of a split press-mold 1, hinged at 2, provided with any suitable lock 3 and preferably having handles not shown. These may be attached to the shanks 4. The mold has an opening 5 at its upper end corresponding to the bottom of the bottle, and shown herein on the bottom end of the press-mold, and a neck opening 6 below. A plunger or piston 7 is provided to coöperate with the opening 5. In the form shown, this piston is mounted to slide in a support 8 which is actuated by means not shown, resilient means, as the air cushion 9 being interposed between the support and the piston. The latter is held in place by pins 10 which slide in slots 11. The press-mold 1 is apertured at its lower extremity surrounding the neck opening 6 to receive the neck-mold 12. The latter is, in the usual form, preferably split and pivoted at 13, each part having a suitable handle as shown at 14. The two molds rest on a cross-head or support 15, mounted to slide vertically upon suitable guides 16. Springs 17, encircling rods 18 which are secured to the base 19 and passed through apertures in the cross-head 15, tend to hold the latter in position at the upper end of the guides 16.

A central pillar 20 carries the stationary punch 21, and mounted on the pillar encircling the same to slide thereon, is the sleeve 22 contracted at its upper extremity to form the hollow former 23. The pillar 20 is encircled by a horizontal groove 24, and an upright groove 25 extends up each side of the pillar joining the horizontal groove 24. The slots 24 and 25 are in effect guide-slots for the sleeve 22 and the hollow punch 23, and the sleeve is provided with followers 26 shown as placed at diametrically opposite points. These followers, as shown, are carried by screw-plugs threaded into suitable apertures in the sleeve. The extremity of each screw is reduced to form a pin which engages the slot.

Depending from the cross-head 15 is a cylindrical cam 27, centrally apertured at 28 to receive the sleeve 22. This cam is provided with helical slots 29 and suitable followers 30 carried by radial arms 31 embedded in the sleeve 22 engage the slots.

The operation of my machine will be clearly understood from the description and preamble. The neck-mold is closed and placed on the cross-head, the press-mold is closed about the neck-mold, the gather is inserted through the aperture 5 and the piston 7 is lowered. The shoulders 32 on the piston support 8 come in contact with the top of the mold and force it down, the springs 17 yielding to permit the cross-head 15 to move downward correspondingly. At this time the pins 26 are in the horizontal slot 24 and spaced from the vertical slots 25 by a considerable angle, say 90 degrees, so that the hollow former 23 cannot move up or down. The cam followers 30 are secured to the sleeve 22 which carries the former 23, and as these followers are thus held against vertical movement and permitted to move horizontally, the vertical motion of the cross-head causes them to traverse the cam slots 29 and rotate the sleeve 22 and the hollow former 23. During this period the mold is moving downward and the hollow punch passes through the neck and beyond the same, compressing the glass into the finish 33 of the neck-mold, and forming the neck opening 34 in the blank. When the pins 26 are rotated through sufficient arc to reach the upright slots 25, which are correspondingly placed on the pillar 20, the neck proper is completed. As the plunger is still moving downward, the spring 17 is still further compressed, and the mold with the cross-head 15 also moves downward. When the sleeve 22 has reached the upper end of the opening 28 in the cam, and its pins are further released from the slot 24, the sleeve 22 with the hollow former 23 moves downward with the mold and the cross-head. However, the central punch 21 is stationary, and the downward motion of the parts to which I have referred, causes it to pass through the hollow punch and onward into the blank, a distance determined by the operator through the extent of the stroke of the plunger and by varying the position of the punch in the post. This is made possible by means of the threaded connection 35 between the punch and the post. I am thus able to introduce a blank through the bottom of the mold, to form the neck, and punch the blank for the introduction of air without injuring the neck or the bottom of the bottle, the pressure necessary in the operation which I have described being considerably less than that necessary in the old apparatus, and also easily determined.

I have thus described in minute detail a single embodiment of my invention in order that its nature and operation may be clearly understood, but the specific terms herein are used in their descriptive rather than in their limiting sense, and the scope of my invention is defined in the claims.

I claim—

1. In a machine for making bottle blanks, a press-mold, open at both ends and mounted to move in the direction of its axis, a hollow former and a punch, both alined with the neck of the press mold, a plunger serving to close the aperture in the bottom end of the press-mold and move it forward in the direction of the neck to introduce the former and punch into the mold, means for supporting and rotating the former whereby it is caused to rotate as it enters the neck, and then recede with the mold so that the punch is caused to protrude beyond the former into the mold.

2. In an apparatus for making bottle blanks, a press-mold open at both ends and mounted to move in the direction of its axis, a hollow former adapted to enter the neck of the mold, a punch to pass through the aperture of the former, means for rotating the former and inserting it through the neck, and means for inserting the punch through the aperture in the former into the mold beyond the former.

3. In a machine for making bottle blanks, a press-mold, a rotary hollow former, a non-rotary punch, means for inserting the rotary former into the neck of the press-mold, means for rotating it as it is inserted, and means for inserting the punch through and beyond the former.

4. In a machine for making bottle blanks, a mold mounted to move in the direction of its axis, a hollow former alined with the neck of the mold, a stationary punch extending into the hollow of the former, means for supporting the hollow former whereby it is first held against longitudinal motion and permitted to rotate, and then permitted to recede, a cam and a follower therefor, the latter connected to the hollow former, means for moving the mold and cam whereby the former is rotated and at the same time caused to enter the neck, and then to move with the mold, whereby the punch passes through the former and beyond it into the blank.

5. In a machine for making bottle blanks, a mold open at both ends, mounted to move in the direction of its axis, a hollow former alined with the neck of the mold, a stationary punch extending into the hollow of the former, means for supporting the hollow former whereby it is first held against longitudinal motion and permitted to rotate and then held against rotation and permitted to recede, a cam and follower therefor, the latter connected to the hollow former, a plunger adapted to close the opening at the end of the mold corresponding to the bottom of the bottle, and to move the mold and cam, whereby the former is rotated and at the same time caused to enter the neck and then to move with the mold so that the punch passes through the former and beyond into the blank.

6. In a machine for making bottle blanks, a press-mold, a rotary hollow former, a non-rotary punch, means for inserting the rotary former into the neck of the press-mold, means for rotating it as it is inserted and then arresting its rotation, and means for inserting the punch through and beyond the former.

7. In an apparatus for making bottle blanks, a press-mold mounted to move in the direction of its axis, a hollow former adapted to enter the neck of the mold and disposed toward the same, a punch in the aperture of the former and means for moving the mold whereby the hollow former is caused to enter the neck, and then to move with the mold so that the punch enters the mold beyond the former, and means actuated with the mold for rotating the hollow former as it is inserted.

Signed at Baltimore Maryland this 31st day of March 1911.

WALTER E. SAVAGE.

Witnesses:
 EMMA WEHMEYER,
 EDWIN F. SAMUELS.